UNITED STATES PATENT OFFICE.

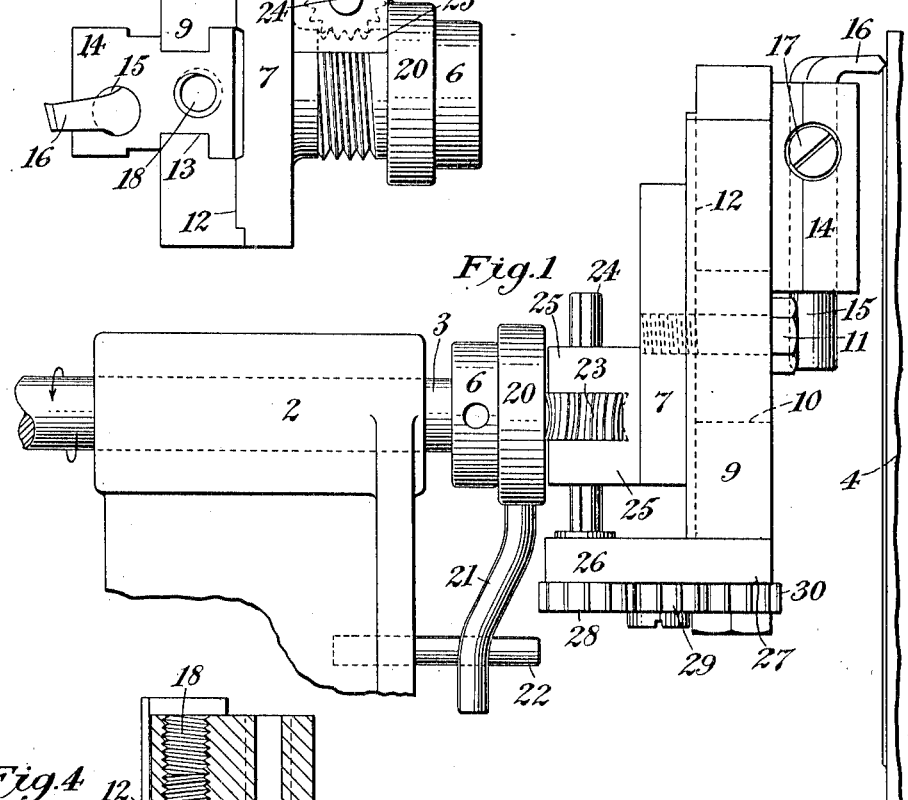

FRANK L. SMITH, OF CHICAGO, ILLINOIS, AND THOMAS B. WILLIAMS, OF ORANGE, MASSACHUSETTS, ASSIGNORS TO THE LEAVITT MACHINE COMPANY, A CORPORATION OF MASSACHUSETTS.

ROTARY CUTTING MECHANISM.

1,090,243. Specification of Letters Patent. Patented Mar. 17, 1914.

Application filed December 9, 1908. Serial No. 466,656.

*To all whom it may concern:*

Be it known that we, FRANK L. SMITH and THOMAS B. WILLIAMS, citizens of the United States, and residents, respectively, of Chicago, county of Cook, State of Illinois, and Orange, in the county of Franklin and State of Massachusetts, have invented certain new and useful Improvements in Rotary Cutting Mechanism, of which the following is a specification.

This invention relates to a rotary cutting mechanism for facing or dressing the surfaces of pieces of work, and the main object of the invention is to provide a cutting mechanism by means of which a cutting tool may be operated with a substantially uniform movement in a spiral cutting path toward or away from the center of such spiral.

In carrying the invention into effect a cutting mechanism is provided in which a tool-head is mounted on a rotary driver and a cutting tool on said tool-head is operatively connected with the driver in such a manner as to have normally an orbital movement in a spiral path either away from or toward the center of the spiral according to the direction of rotation of the driver.

In apparatus of this kind it is important to provide a very firm and rigid support for the cutting tool, and the parts are so constructed and combined that the tool has the maximum amount of support while taking its cut.

The normal movement of the cutting tool will ordinarily be due to the relatively rapid rotation of the driver or shaft by which the tool and its head are carried and to the relatively slow feed of the cutter on the tool-head toward or away from the axis of rotation of said driver. This produces a movement of the cutter in a spiral path very gradually receding from or approaching such axis of rotation. When it is desired to obtain a quick adjustment of the tool to a new position, this may be accomplished as by disconnecting the cutter from the means which normally drives it and imparting a quick feed movement to it on the tool-head. The means which we prefer to employ for accomplishing this result will be hereinafter particularly described.

One important feature of the invention is the provision of gearing, preferably worm gearing, between the cutter and the rotary driver for converting the rotary movement of the driver into an orbital movement of the cutter, this result being accomplished by employing a stationary or resistant gear, such as a worm, which operates to turn slowly a driven worm gear operatively connected with the cutter through suitable mechanism. By means of this resistant driving gear a slow but uniform feed movement is imparted to the cutter.

Other features of the invention not hereinbefore referred to will be hereinafter described and claimed and are illustrated in the accompanying drawings, in which—

Figure 1 is a side elevation of a rotary cutting mechanism constructed in accordance with the present invention and in operative relation with a piece of work; Fig. 2 is an end elevation of the tool-head, looking toward the cutter; Fig. 3 is an opposite end elevation of the same, showing the gearing through which movement is imparted to the cutter; Fig. 4 is a substantially central longitudinal section of the tool-head showing especially the means for obtaining a quick adjustment of the tool-feeding devices.

Similar characters designate like parts in all the figures of the drawing.

In carrying this invention into effect any suitable means, such for example as the bearing 2, may be employed for supporting the various parts for operation, this bearing carrying in the construction illustrated the main driver or spindle 3 by means of which the tool-head and the tool carried thereby are operated. This tool-head and the cutter itself may be mounted in operative relation with the work in any suitable manner, and various materials may be faced by the action of the cutter, it being of course important that the work, which is indicated at 4, be held in the proper working position and that the cutter be mounted on a stiff and solid support to avoid chattering.

The tool-head employed is preferably firmly secured to the rotary driver 3 in such a manner as to rotate in unison therewith. The connection may be made in any suitable manner, as by threading the end of the spindle 3 into a correspondingly threaded bore 5 in one of the main parts 6 of the tool-head. The part 6 as constructed constitutes a hub of several diameters reduced at its end and threaded into a correspondingly threaded opening in one of the main members of the tool-head, viz., a block 7. When screwed home, these two parts may be locked firmly in position as by means of a screw 8. The block 7 in turn has attached thereto an adjustable carriage 9 slotted at 10 for the purpose of permitting a considerable range of adjustment of the carriage, screws 11 passing through the slots 10 (of which there will preferably be two, at opposite sides thereof) being shown as screwed into the block 7 for the purpose of holding the carriage firmly clamped to said block in the desired adjusted position and for permitting the release of said carriage when a new adjustment is required. The carriage and the block are formed with suitable ways 12, which maintain the parts in their proper positions laterally while permitting free movement of the same longitudinally of each other when the screws 11 are loosened. The carriage 9 also has ways 13 for the purpose of holding and guiding a slide-rest for carrying the cutting tool. This slide-rest may be of the type indicated at 14, being formed from a block having channels or ways complementary to those of the carriage 9. This slide-rest is bored longitudinally for the reception of the shank 15 of a cutter 16 and transversely for a locking-screw 17 by means of which the tool is secured in its working position. The slide-rest is also bored and threaded at 18 to form a fixed nut in which a feed-screw, such as 19, works. By means of this feed-screw the rotary movement of the driver 3 is imparted to the slide-rest and a corresponding feed movement to the cutter.

It is important to provide between the cutter and the rotary driver 3 power transmitting connections of such a type as to assure the gradual feeding of the cutter away from or toward the axis of rotation of the spindle 3 for the purpose of permitting the cutter to work with a gradually increasing or decreasing radius, according as the spindle 3 is rotated in one direction or the other. In order to obtain this steady substantially uniform feed movement of the cutter the feed-screw 19 is normally preferably driven by gearing of such a type and ratio as to assure a slow by steady rotation of the feed-screw and consequent feed movement of the slide-rest and its cutter. The primary element of this gearing is illustrated herein as a worm of the fixed type, that is to say, one that is stationary during the rotation of the spindle 3 and the tool-head proper and which operates as a resistant gear to drive a worm-gear moving orbitally about said worm as the spindle rotates. This worm is indicated at 20 and is mounted on the smooth central portion of the hub 6 between the stop-wall formed by the largest diameter of the hub and the cheek of the block 7 fastened to said hub. The worm is of course placed in position before the block and the hub are locked together, and when the parts are assembled it permits the hub to turn freely within it. In order that it may serve as a resistant driver this worm 20 is held stationary during the rotation of the shaft 3, this being accomplished in any desired manner, as by providing a projecting arm or pin 21 movable in the path of a stop 22 projecting from the fixed framing of the machine.

It will be obvious that when the arm 21 is in engagement with the stop 22, with the shaft rotating in the direction indicated by the arrow in Fig. 1, the worm 20 will remain stationary and the gearing carried by the tool-head will revolve about it. The principal driven element will preferably be a worm gear 23 in mesh with the worm 20 and mounted on a shaft 24 journaled in suitable bearings on the tool-head. Two of these bearings are indicated at 25 and are carried directly by the block 7. Another one is indicated at 26 and is located in an end-piece 27 forming part of the carriage 9. The worm-gear preferably fills the space between the cheeks of the bearings 25 and is splined on the shaft 24 in order that said shaft and its carriage may be adjusted on the block 7 to shift the position of the slide-rest and its tool. The manner in which this adjustment is made has been hereinbefore described. At the outer end thereof the shaft 24 has secured thereto a spur-gear 28 which through similar gears 29 and 30 drives the feed-screw 19. All of the gears 20, 23, 28, 29 and 30 are permanently in operative relation with one another, but the gear 30 though also normally connected to the feed-screw 19 for driving the same may be disconnected therefrom. The means for accomplishing this is illustrated in detail in Fig. 4. It comprises in the construction shown a coupling device in the form of a pin 31 having a key 32 projecting therefrom and normally engaging in a key-way 33 in the inner end of the opening in the gear, said key being also always in engagement with the walls of a key-way 34 in the outer end of the feed-screw. A spring, such as 35, normally holds the pin 31 in position for positively coupling the gear 30 to the feed-screw and transmitting the movement of said spur-gear to said feed-screw, but when the pin 31 is pushed in, as by inserting a screw-driver in the nick in the head of the pin, the parts are uncoupled and the feed-screw may be readily and quickly turned while the pin is kept pressed in to keep the parts uncoupled. When the pin is released the spring snaps it back to lock the key 32 in some one of the circuit of notches or key-ways 33 in the gear 30.

The major portion of the feed-screw near its outer end is smooth, as shown at 36, and is journaled in the carriage 9 and its end-piece 27, the feed-screw being located so as to be held against longitudinal movement by means of a stop-flange 37 and the gear 30, which may be held in place on the end of the feed-screw by a stop-nut 38.

From the construction of the parts just described it will be clear that the rotary movement of the spindle 3 is transmitted through the worm gearing, the shaft 24 and the train of spur-gearing to the feed-screw in the normal operation of the device, and that the feed-screw imparts a feed movement to the slide-rest because of its operative connection with a rotary worm gear driven by a stationary worm when it is revolved around and in mesh with said worm by the rotation of the spindle 3. A direct and positive feed movement uniform in its character is thus obtained. The movement imparted to the cutter is a correspondingly uniform movement in a spiral path gradually increasing or decreasing in radius according to the direction of rotation of the main driver 3. Thus both a slow and uniform feed of the tool during action, or a quick adjustment of the tool through the disconnection of the gear 30 from the feed-screw, may be obtained. Moreover, the positions of the carriage and the slide-rest may be so adjusted relatively to each other and to their main support, the block 7, as to permit the tool 16 to cut substantially from the axis of the spindle 3 to a point measured by the radius of the extreme adjustment of the tool.

The tool employed may be adjusted to different angular positions by simply turning its shank in the bore in the slide-rest and then locking it in position by means of the screw 17. The cutting edge of the tool may be formed in various ways, a preferred type of cutter being illustrated in the drawings.

What we claim is:

1. In a rotary cutting mechanism, the combination with a main driving spindle disposed in its operative position at a right angle to the work to be faced, and with a bearing for supporting said spindle, of a cutting mechanism embodying the following elements, viz.—a tool-head secured to the end of said spindle for rotation therewith, a feed-screw on said tool-head, a slide-rest positively connected with said feed-screw, a cutting tool carried by said slide-rest, and movable means carried wholly by said tool-head and removable with it from the spindle and the movements of which are derived solely from the rotation of said spindle for actuating said feed-screw and thereby converting the continuous rotation of said spindle into a substantially uniform spiral movement of said cutter.

2. In a rotary cutting mechanism, the combination with the main driving spindle thereof disposed in its operative position at a right angle to the work to be faced, of a tool-head secured to said spindle for rotation therewith, a feed-screw on said tool-head, a slide-rest positively connected with said feed-screw, a cutting tool carried by said slide-rest, movable means carried wholly by said tool-head and removable with it from the spindle and the movements of which are derived solely from the rotation of said spindle for actuating said feed-screw and thereby converting the continuous rotation of said spindle into a slow and substantially uniform spiral movement of said cutter, and means on the tool head for interrupting the driving connection between said spindle and the slide-rest to permit a quick feed movement of said slide-rest and its cutter.

3. In a rotary cutting mechanism, the combination with a rotary driver, of a tool-head secured to said driver for rotation therewith, a feed-screw on said tool-head, a slide-rest positively connected with said feed-screw, a cutting tool carried by said slide-rest, gearing carried wholly by said tool-head and removable with it from the spindle and the movements of which are derived solely from the rotation of said spindle for converting the continuous rotation of said driver into a slow and substantially uniform feed movement of said feed-screw, and means for disconnecting the feed-screw from said gearing and permitting a quick feed movement of said feed-screw.

4. In a rotary cutting mechanism, the combination with a rotary driver, of a tool-head secured to said driver for rotation therewith, a feed-screw on said tool-head, a slide-rest positively connected with said feed-screw, a cutting tool carried by said slide-rest, mechanism carried on said tool-head for converting the continuous rotation of said driver into a slow and substantially uniform feed movement of said feed-screw, and means carried by said feed-screw for connecting it with and disconnecting it from said mechanism.

5. In a rotary cutting mechanism the combination with a rotary driver, of a tool-head secured to said driver for rotation therewith, a feed-screw on said tool-head and movable transversely to the axis of said driver, a slide-rest positively connected with said feed-screw, a cutting tool carried by said slide-rest, a fixed stop adjacent to said rotary driver, a stationary driving worm mounted on said rotary driver and having an arm extending into the path of said stop, and a revoluble driving worm gear secured to the tool-head and in mesh with said worm and operatively connected with said feed-screw for converting the continuous rotation of the driver into a substantially uniform spiral movement of said cutter.

6. In a rotary cutting mechanism, the combination with a main driving spindle disposed in its operative position at a right angle to the work to be faced, and with a bearing for supporting said spindle, of a cutting mechanism embodying the following elements, viz.—a tool-head secured to the end of said spindle for rotation therewith, a cutting tool, and movable means carried wholly by said tool-head and removable with it from the spindle and the movements of which are derived solely from the rotation of said spindle and including a tool-carrying slide mounted on said tool-head and movable transversely to the axis of rotation thereof for converting the continuous rotation of said spindle into a substantially uniform spiral movement of said cutting tool.

Signed at Chicago in the county of Cook and State of Illinois this first day of December, A. D. 1908.

FRANK L. SMITH.

Witnesses:
CHAS. H. BURTON,
JULIA S. ABBOTT.

Signed at Orange, in the county of Franklin, and State of Massachusetts, this 19th day of November, A. D. 1908.

THOMAS B. WILLIAMS.

Witnesses:
FRED A. DEXTER,
FRANK A. HOWE.

---

Copies of this patent may be obtained for five cents each, by addressing the "Commissioner of Patents, Washington, D. C."